(12) United States Patent
Osaka et al.

(10) Patent No.: US 12,744,287 B2
(45) Date of Patent: Sep. 22, 2026

(54) BUS BAR MODULE

(71) Applicant: YAZAKI CORPORATION, Tokyo (JP)

(72) Inventors: Ryosuke Osaka, Makinohara (JP); Kimitoshi Makino, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 672 days.

(21) Appl. No.: 18/341,693

(22) Filed: Jun. 26, 2023

(65) Prior Publication Data

US 2024/0006724 A1 Jan. 4, 2024

(30) Foreign Application Priority Data

Jun. 29, 2022 (JP) ................................ 2022-104425

(51) Int. Cl.
*H01M 50/507* (2021.01)
*H01M 50/519* (2021.01)

(52) U.S. Cl.
CPC ....... *H01M 50/507* (2021.01); *H01M 50/519* (2021.01)

(58) Field of Classification Search
CPC ............ H01M 50/502; H01M 50/503; H01M 50/507; H01M 50/519
USPC .............................................................. 429/7
See application file for complete search history.

(56) References Cited

U.S. PATENT DOCUMENTS 11,239,533 B2 2/2022 Zeng et al.
2019/0044197 A1 2/2019 Ota et al.
2020/0020916 A1 1/2020 Takamatsu et al.
2020/0020917 A1* 1/2020 Ichikawa ............ H01M 10/482
2020/0396830 A1* 12/2020 Yasuda .................. H05K 1/189
2022/0013867 A1* 1/2022 Takahashi .............. H05K 1/028

FOREIGN PATENT DOCUMENTS

CN 110707275 A 1/2020
JP 2013-97894 A 5/2013
JP 2019-23996 A 2/2019
JP 2019-32928 A 2/2019
WO WO-2020105402 A1 * 5/2020 ............ H01M 50/50

* cited by examiner

*Primary Examiner* — Jonathan G Leong
*Assistant Examiner* — John S Medley
(74) *Attorney, Agent, or Firm* — KENEALY VAIDYA LLP

(57) ABSTRACT

A bus bar module includes a plurality of bus bars fixed to battery cells, and a circuit body. The circuit body includes a trunk line part extending along a first direction, and a plurality of branch parts. The branch parts include a coupling branch part connected to the two bus bars. The coupling branch part includes a first fixed part fixed to a first bus bar, a second fixed part fixed to a second bus bar, a first extending part, and a second extending part. The second extending part has a length with which the first bus bar and the second bus bar can be fixed to the battery cell while bending the second extending part to be deformed.

3 Claims, 10 Drawing Sheets

100
1
2
2
3
4
5
Z
X
Y
120
120
120a
120a
121
121
121
121
121a
121b
110

Z
Y
X
1
2
2A
2B
3
4
5
23
24
30
30a
30b
31
32
41
42
51

Z
X
Y
1
100
3
30
6
61
62
63
(31)
32
33
34
35
36
37
38
22
7
8
120a
21
110
120
121
23
(2)
24
(2)

1
3
30
33
61
34
22
35
23
(2)
36
62
32 (31)
22
37
24
(2)
L1
38
63
8
31
2
31
2
31
2
X
Y

Y
X
VII
VII
1
2
3
4
8
21a
21a
23
(2)
24
(2)
30
(31)
32
33
34
35
36
37
38
41
41
41
43
43
44
44

1
3 30
33
34
35
(2) 23
36
32 (31)
(2) 24
37
38
8
4
X
Y
Z 1
3
30
31
33
34
22
35
32P
(31)
32
36
37
38
8
2
23
(2)
24
(2)
Y
X
X1
X2

Y
X
35
34
33
32 (31)
36
37
31
38
30
3
31
8
23
(2)
24
(2)
2

Y
31
22
24
(2)
30x
37
36
32P
30c
33
32
(31)
23
(2)
34
35
X2
X
X1
1
31
2
30
3

BUS BAR MODULE

CROSS-REFERENCE TO RELATED APPLICATION(S)

The present application claims priority to and incorporates by reference the entire contents of Japanese Patent Application No. 2022-104425 filed in Japan on Jun. 29, 2022.

BACKGROUND OF THE INVENTION

1. Field of the Invention

The present invention relates to a bus bar module.

2. Description of the Related Art

In the related art, there is known a bus bar module. Japanese Patent Application Laid-open No. 2019-23996 discloses a battery connection module including a flexible circuit board that includes a main body and a plurality of L-shaped flexible arms extending from the main body. The L-shaped flexible arm disclosed in Japanese Patent Application Laid-open No. 2019-23996 includes a first section extending outwardly from the main body toward a plurality of bus bars, a second section that is connected to the first section and extends in a direction between the bus bars and the main body, and an end part that is positioned at a distal end of the second section and connected to a corresponding bus bar.

There is room for further improvement in terms of improving a degree of freedom in design of the bus bar module. More specifically, there is a demand for improving a degree of freedom in design for a configuration of branching a branch part from a trunk line part of a circuit body and connecting the branch part to the bus bar. For example, it is preferable to secure a following property of the bus bar with respect to a battery cell while avoiding interference between other components and the branch part. For example, if the number of required branch parts can be reduced, a degree of freedom in design of the circuit body is improved.

SUMMARY OF THE INVENTION

The present invention aims at providing a bus bar module that can improve a degree of freedom in design.

In order to achieve the above mentioned object, a bus bar module according to one aspect of the present invention includes a plurality of bus bars fixed to a plurality of battery cells of a battery module including the battery cells; and a plate-shaped circuit body having flexibility and including a plurality of connection conductors corresponding to the bus bars, wherein the circuit body includes a trunk line part extending along a first direction in which the battery cells are arranged, and a plurality of branch parts branched from the trunk line part to be connected to the bus bars, the branch parts include a coupling branch part connected to the two bus bars, the two bus bars include a first bus bar and a second bus bar adjacent to each other in the first direction, the coupling branch part includes a first fixed part fixed to the first bus bar, a second fixed part fixed to the second bus bar, a first extending part, and a second extending part, the first extending part extends along the first direction between the trunk line part and the first fixed part, the second extending part extends along the first direction between the first fixed part and the second fixed part, and the second extending part has a length with which the first bus bar and the second bus bar are able to be fixed to the battery cell while bending the second extending part to be deformed.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes a bus bar module according to an embodiment of the present invention in detail with reference to the drawings. The present invention is not limited to the embodiment. Constituent elements in the following embodiment include a constituent element that is easily conceivable by those skilled in the art, or substantially the same constituent element.

Embodiment

Figure 1:
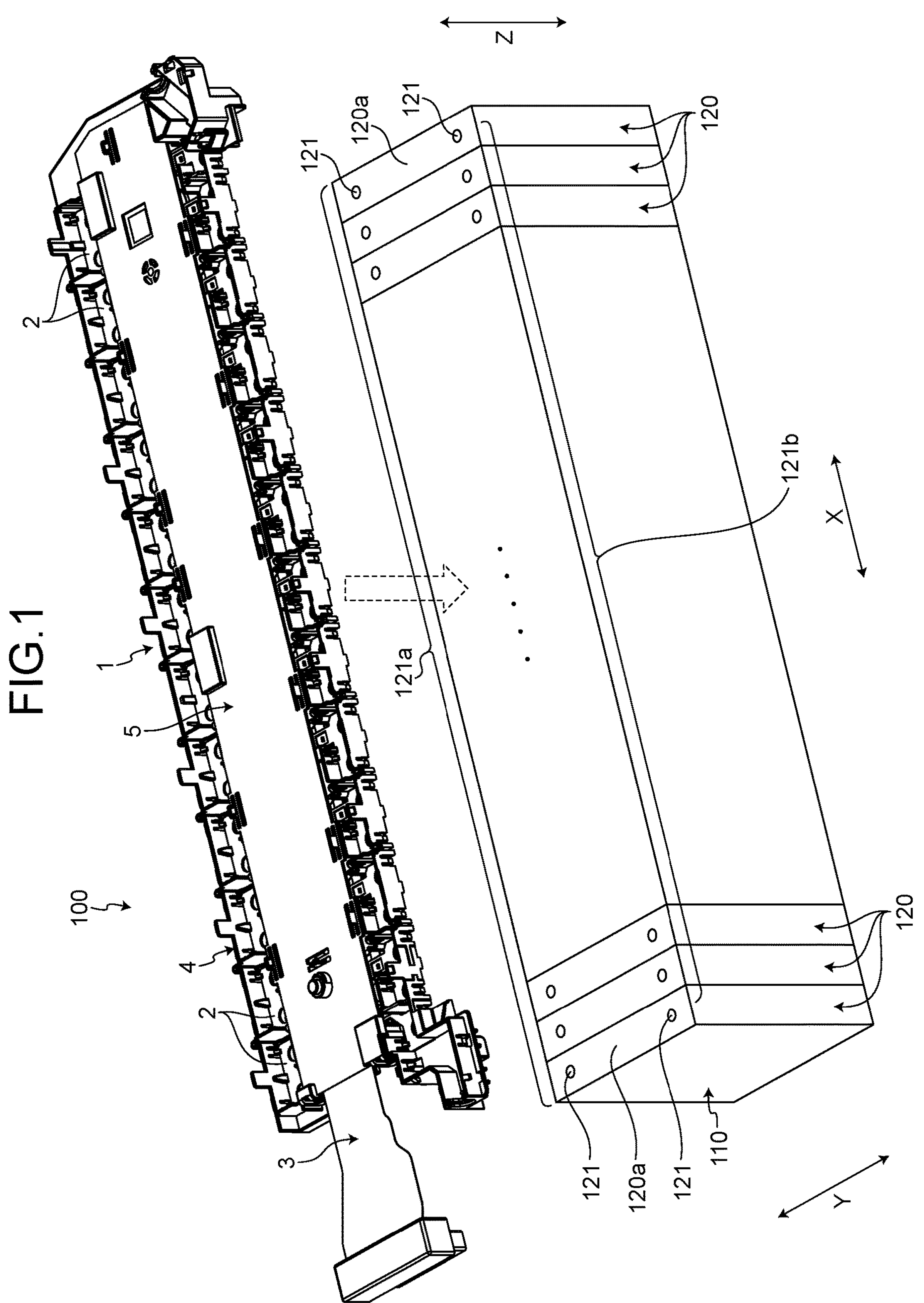
FIG. 1 is a perspective view illustrating a schematic configuration of a battery pack according to an embodiment.
Figure 2:
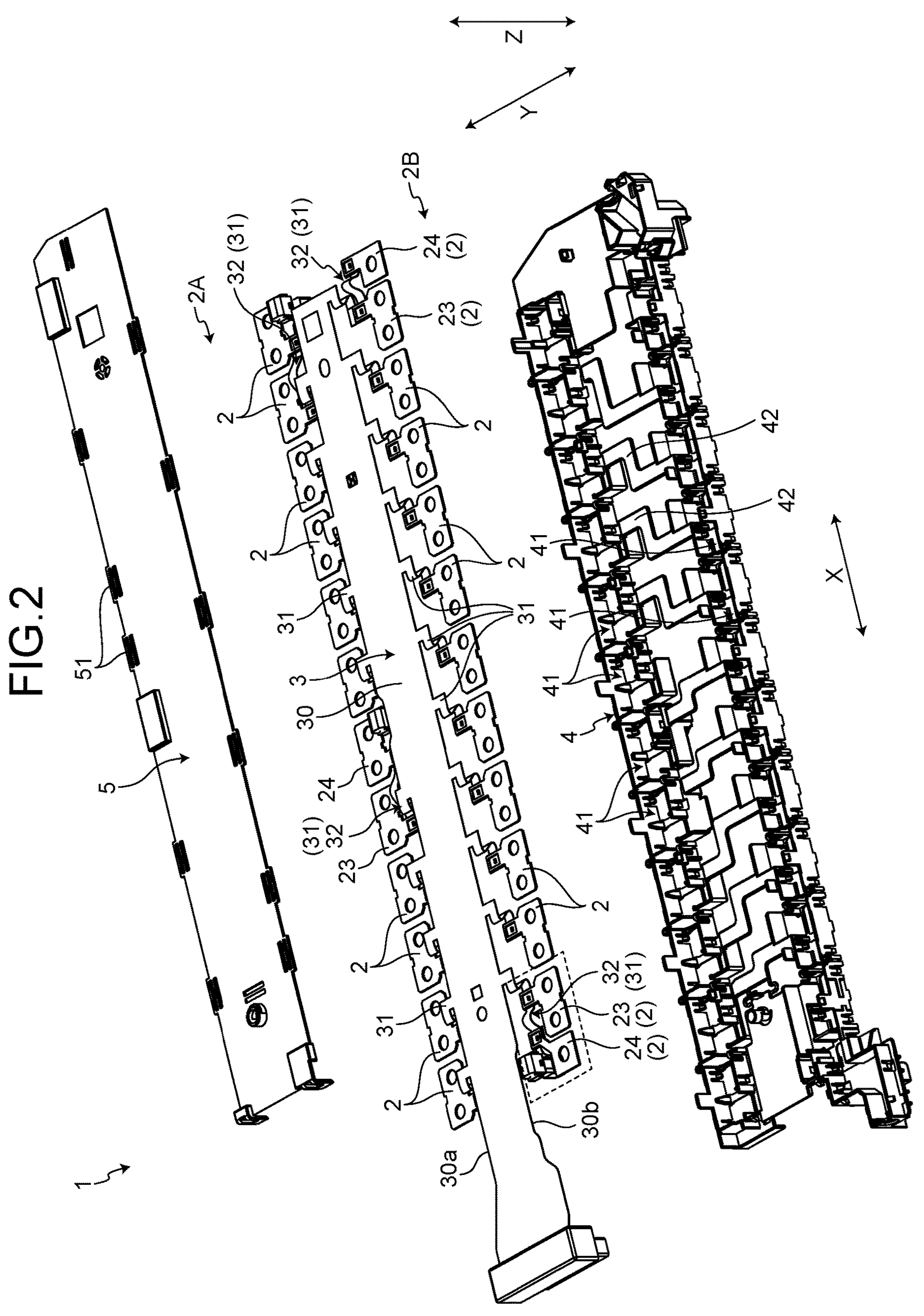
FIG. 2 is an exploded perspective view of a bus bar module according to the embodiment.
Figure 3:
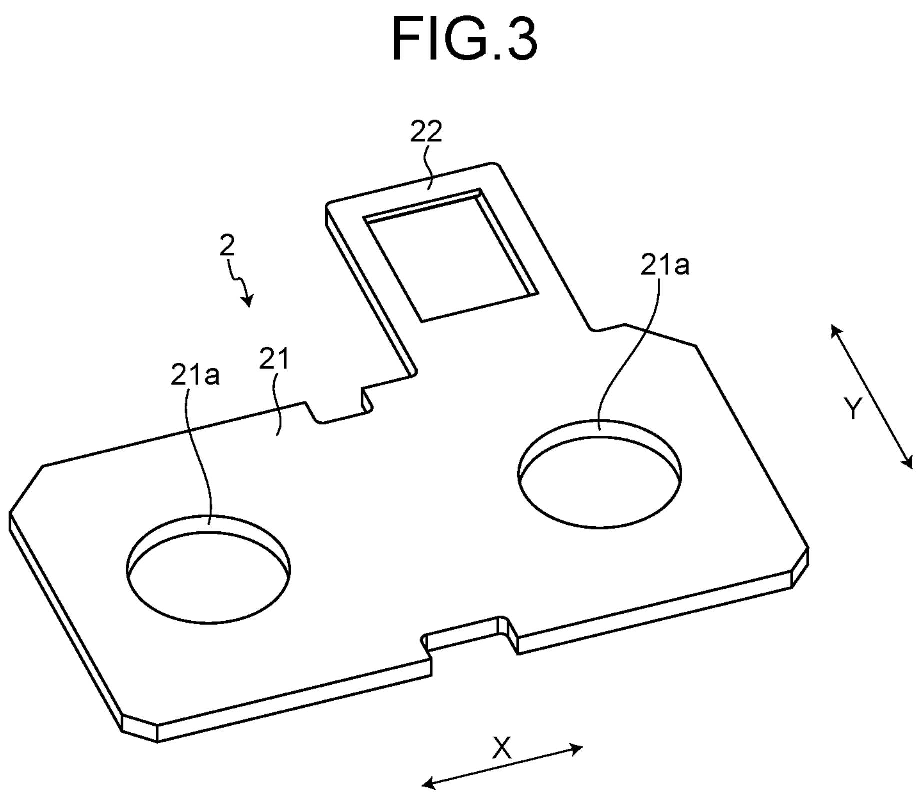
FIG. 3 is a perspective view of a bus bar according to the embodiment.
Figure 4:
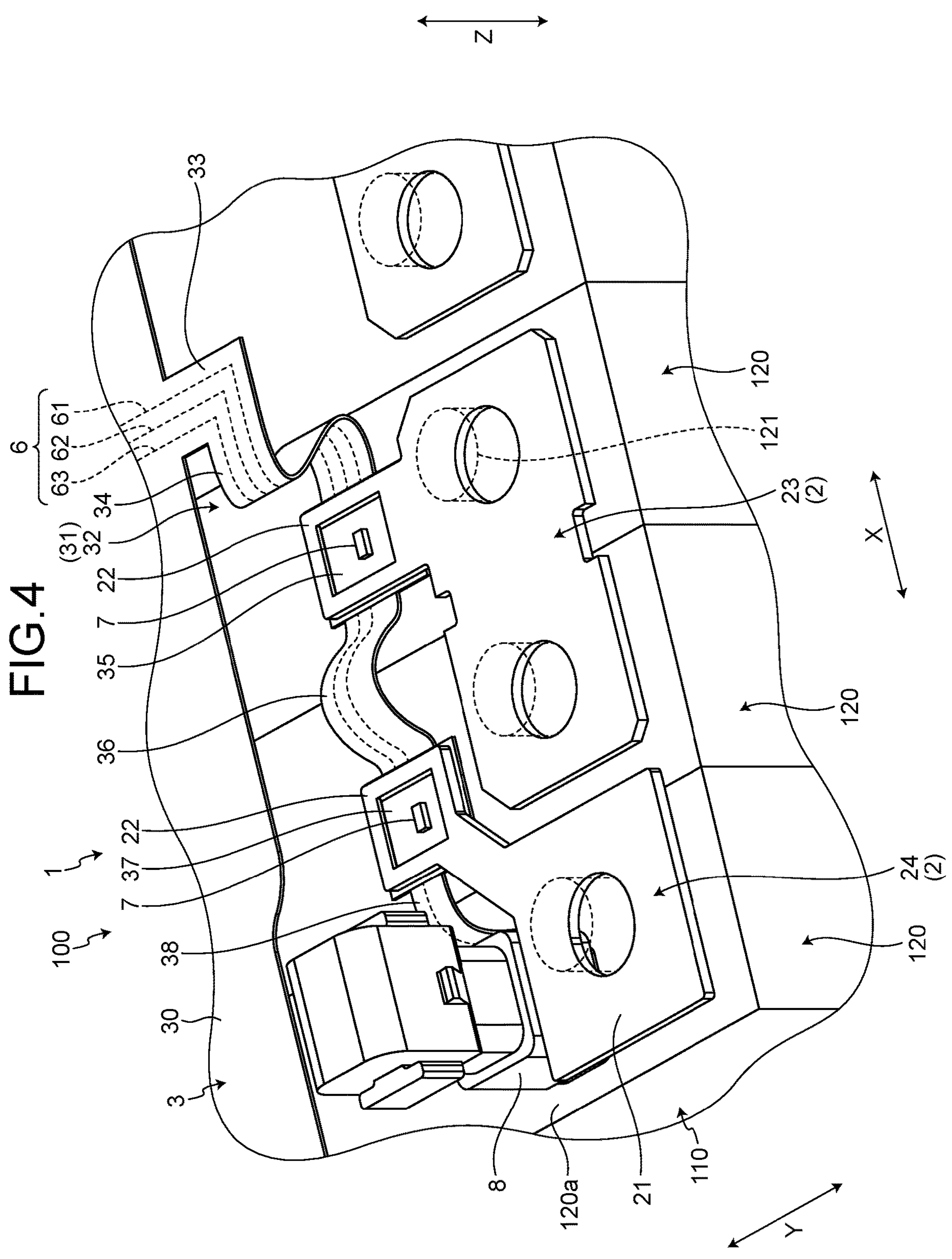
FIG. 4 is an enlarged view of a coupling branch part according to the embodiment.
Figure 5:
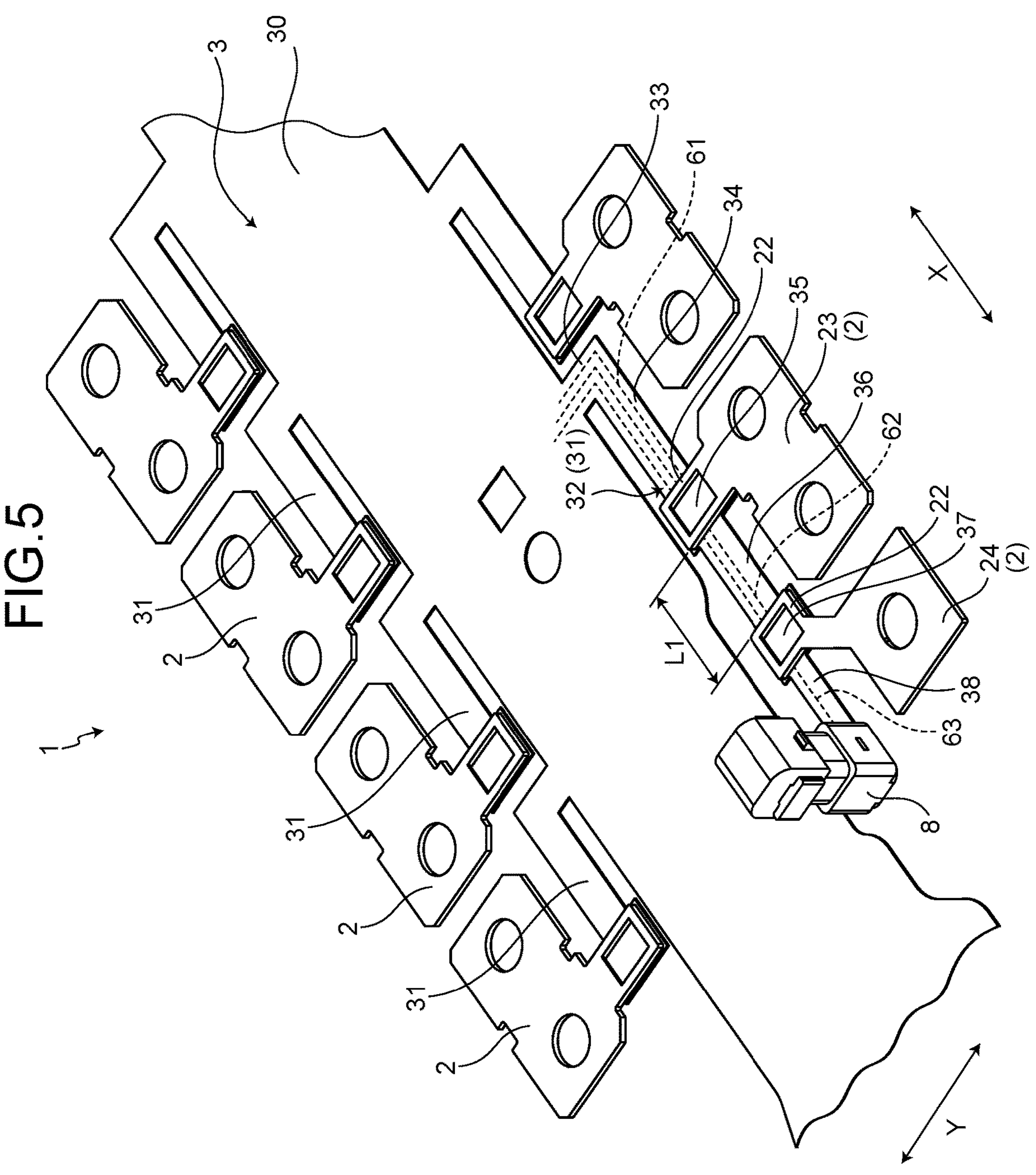
FIG. 5 is a perspective view illustrating the coupling branch part before being housed in a case.
Figure 6:
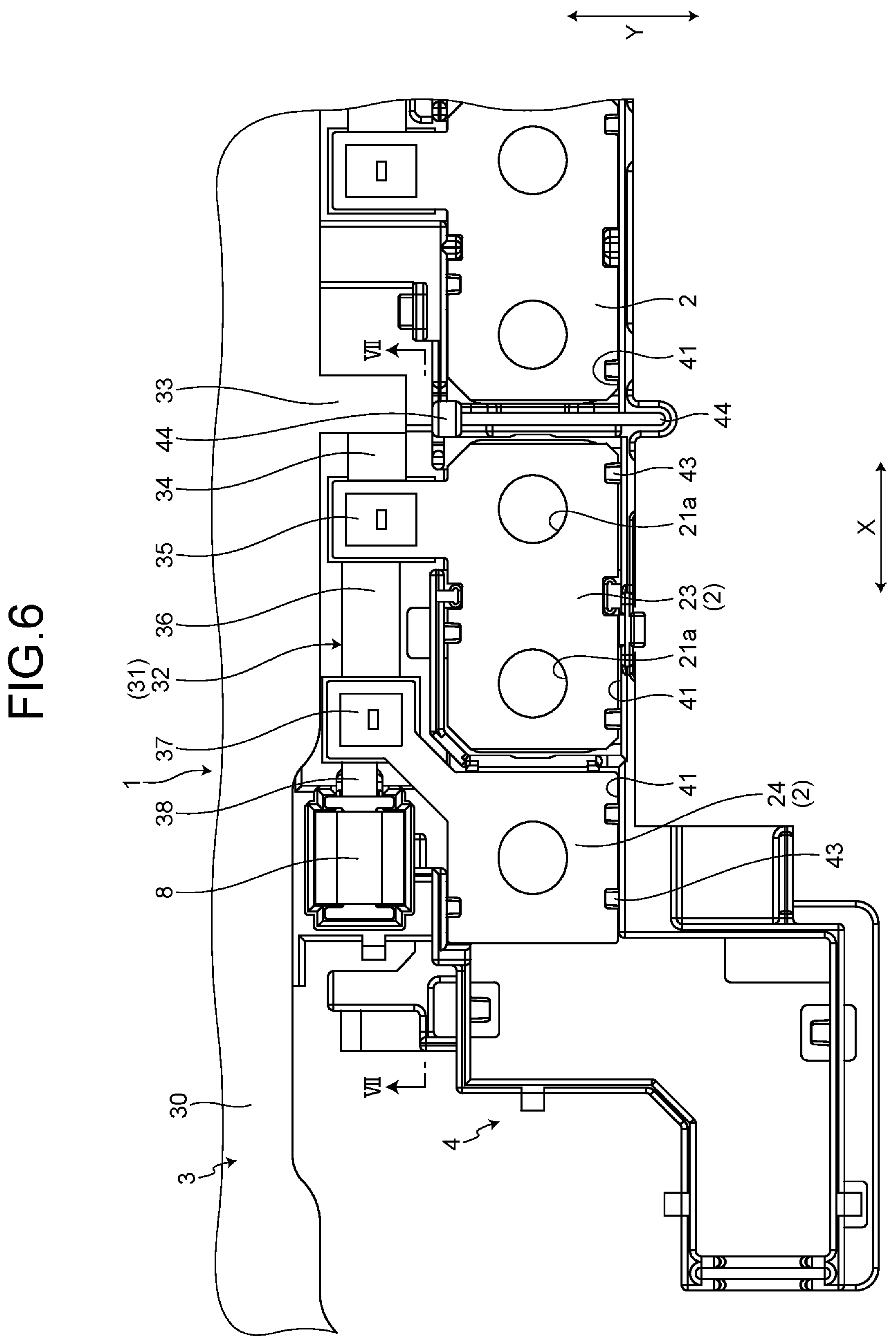
FIG. 6 is a plan view illustrating the coupling branch part housed in the case.
Figure 7:
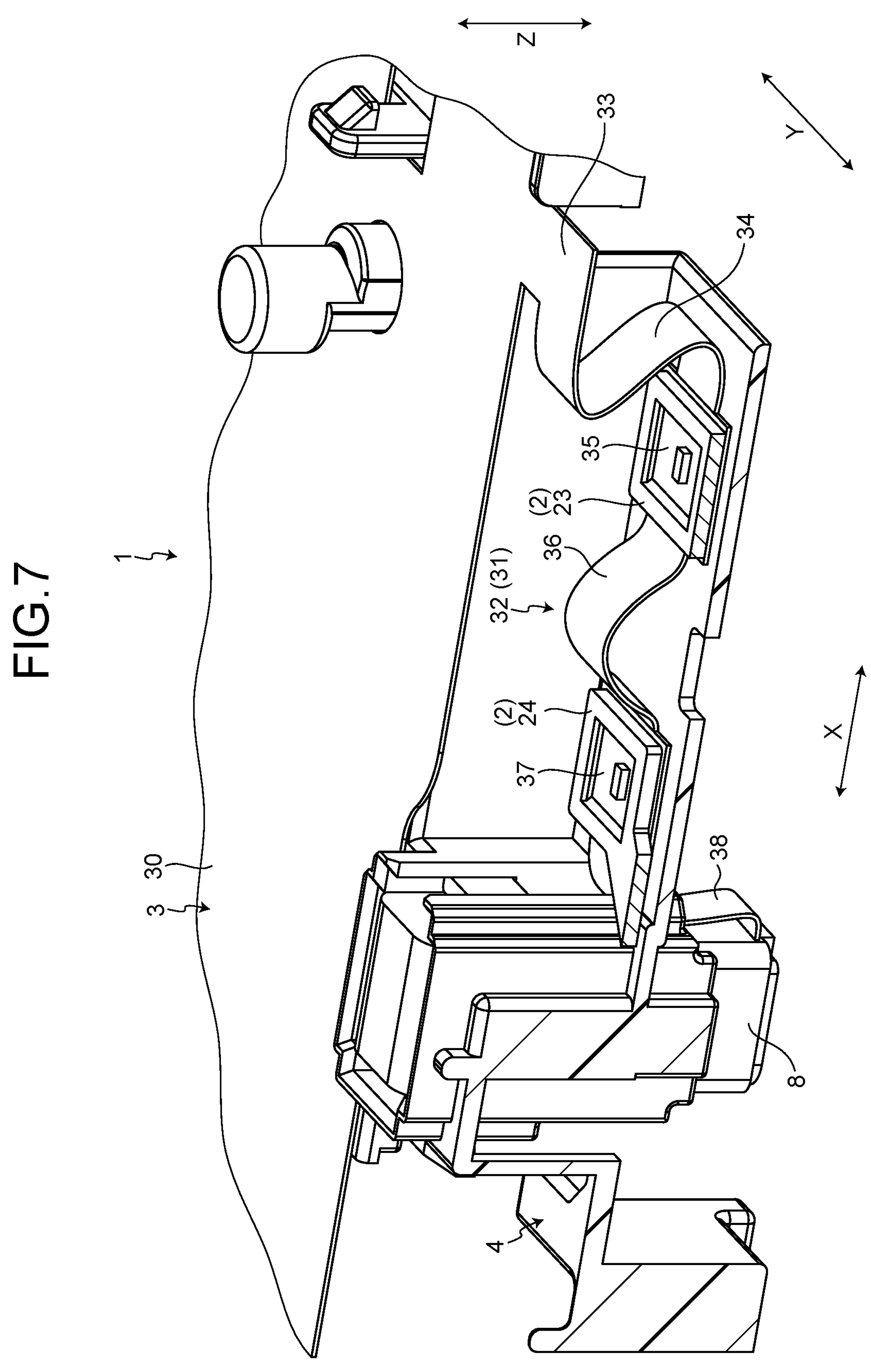
FIG. 7 is a cross-sectional perspective view illustrating the coupling branch part housed in the case.
Figure 8:
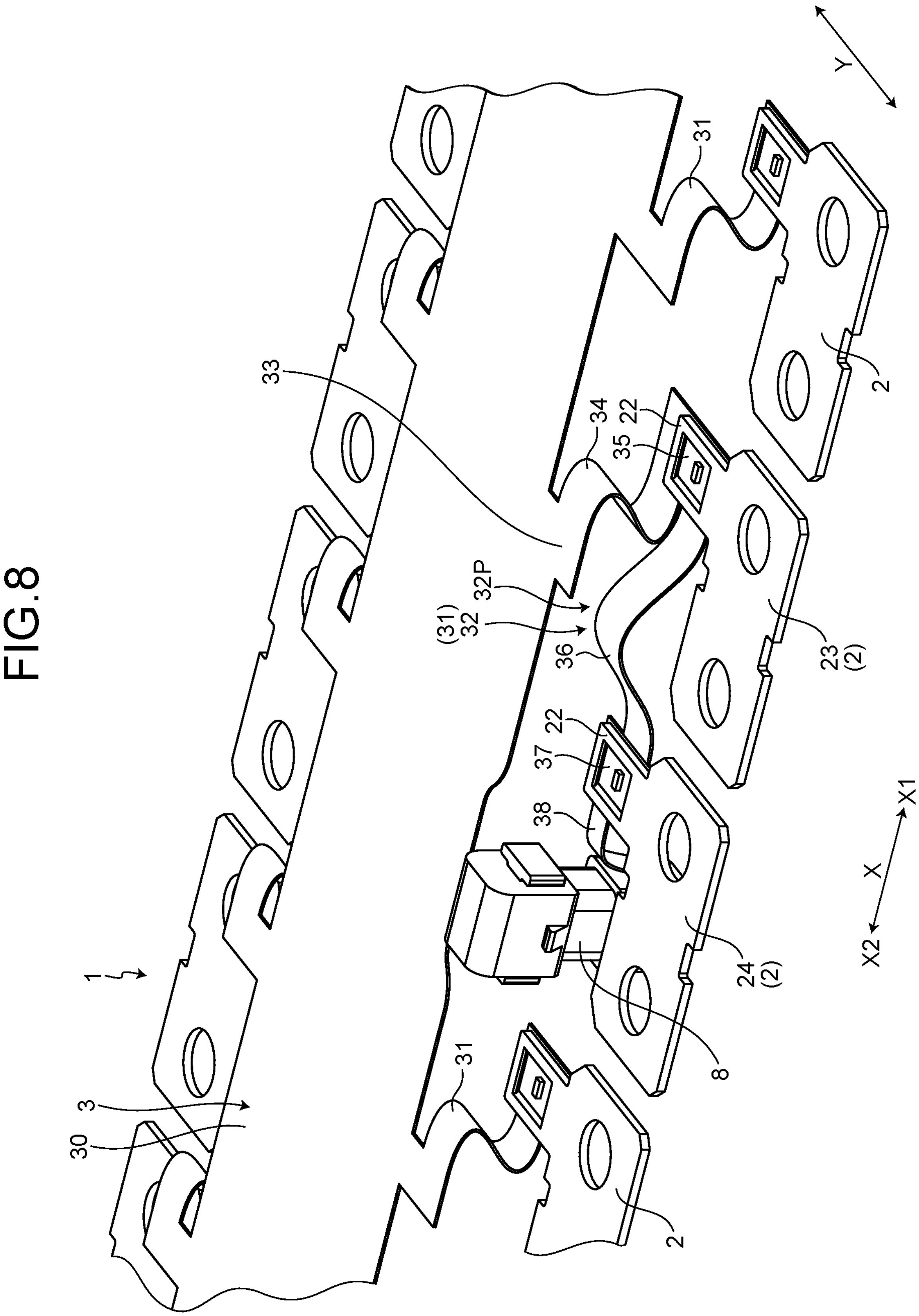
FIG. 8 is a perspective view of a parallel branch part according to the embodiment.
Figure 9:
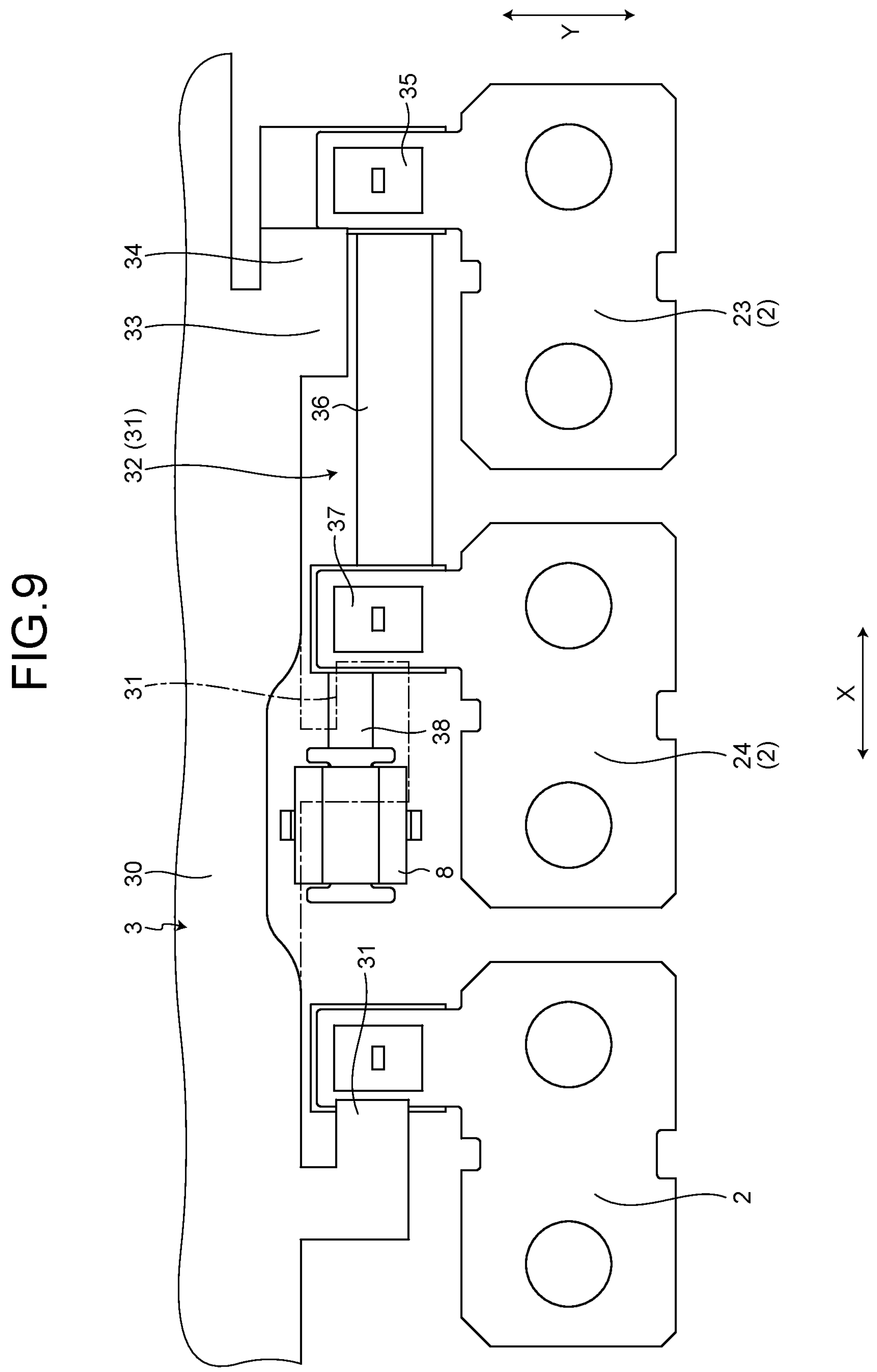
FIG. 9 is a plan view of the parallel branch part according to the embodiment.
Figure 10:
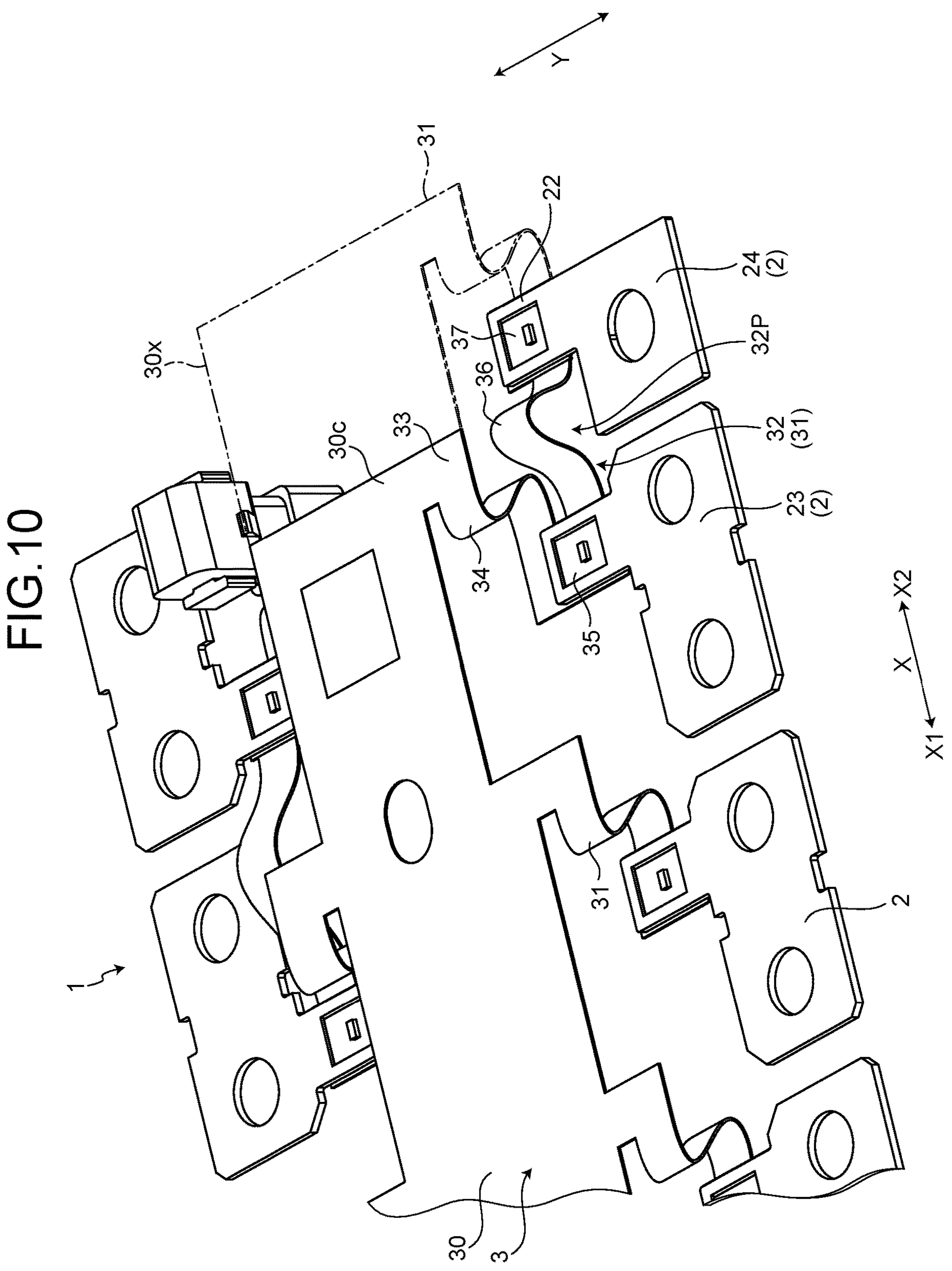
FIG. 10 is a perspective view of the parallel branch part according to the embodiment.

The following describes the embodiment with reference to FIG. 1 to FIG. 10. The present embodiment relates to a bus bar module. FIG. 1 is a perspective view illustrating a schematic configuration of a battery pack according to the embodiment, FIG. 2 is an exploded perspective view of the bus bar module according to the embodiment, FIG. 3 is a perspective view of a bus bar according to the embodiment, FIG. 4 is an enlarged view of a coupling branch part according to the embodiment, FIG. 5 is a perspective view illustrating the coupling branch part before being housed in a case, FIG. 6 is a plan view illustrating the coupling branch part housed in the case, FIG. 7 is a cross-sectional perspective view illustrating the coupling branch part housed in the case, FIG. 8 is a perspective view of a parallel branch part according to the embodiment, FIG. 9 is a plan view of the parallel branch part according to the embodiment, and FIG. 10 is a perspective view of the parallel branch part according to the embodiment. FIG. 7 illustrates a VII-VII cross section in FIG. 6.

As illustrated in FIG. 1, a battery pack 100 according to the present embodiment includes a bus bar module 1 and a battery module 110. The battery pack 100 is mounted, as a power source, on a vehicle such as an electric vehicle (EV), a hybrid electric vehicle (HEV), and a plug-in hybrid electric vehicle (PHEV). The battery pack 100 may also include a plurality of the bus bar modules 1 and a plurality of the battery modules 110.

The battery module 110 includes a plurality of battery cells 120. The shape of the exemplified battery cell 120 is a rectangular parallelepiped shape. Two electrodes 121 are arranged on a first surface 120*a* of the battery cell 120. The shape of the first surface 120*a* is a substantially rectangular shape.

The battery cells 120 are arranged along a first direction X. More specifically, the battery cells 120 are arranged so that a long side of the first surface 120*a* is opposed to a long side of the other first surface 120*a* adjacent thereto in the first direction X. In the following description, a direction of the first surface 120*a* orthogonal to the first direction X is referred to as a "second direction Y". The second direction Y is a longitudinal direction of the first surface 120*a*. A direction orthogonal to both of the first direction X and the second direction Y is referred to as a "third direction Z". The third direction Z is a height direction of the battery cell 120. The first surface 120*a* is orthogonal to the third direction Z. The battery pack 100 is mounted on the vehicle so that the first surface 120*a* faces an upper side of a vehicle upper/lower direction, for example.

The two electrodes 121 on the first surface 120*a* are arranged side by side in the second direction Y. One of the two electrodes 121 on the first surface 120*a* is a positive electrode, and the other one thereof is a negative electrode. An aggregate of electrodes 121 arranged on one end in a longitudinal direction of the first surface 120*a* is referred to as a "first electrode group 121*a*". An aggregate of electrodes 121 arranged on the other end in the longitudinal direction of the first surface 120*a* is referred to as a "second electrode group 121*b*". In the battery module 110 according to the present embodiment, positive electrodes and negative electrodes are alternately arranged in the first electrode group 121*a*. Additionally, the positive electrodes and the negative electrodes are alternately arranged in the second electrode group 121*b*. In the bus bar module 1 according to the present embodiment, the battery cells 120 are connected in series.

The bus bar module 1 includes a plurality of bus bars 2, a plate-shaped circuit body 3, a case 4, and a cover 5. The bus bar 2 is formed of a conductive metal plate such as copper or aluminum. As illustrated in FIG. 2, the bus bar module 1 includes a first bus bar group 2A and a second bus bar group 2B. Each of the first bus bar group 2A and the second bus bar group 2B includes the bus bars 2 arranged side by side along the first direction X. The bus bars 2 of the first bus bar group 2A are fixed to the first electrode group 121*a* of the battery module 110. The bus bars 2 of the second bus bar group 2B are fixed to the second electrode group 121*b*.

As illustrated in FIG. 3, the bus bar 2 according to the present embodiment includes a main body 21 and a frame part 22. The main body 21 is a portion fixed to the electrode 121, and has a flat plate shape. The main body 21 includes one or two through holes 21*a* disposed thereon. The bus bar 2 including the two through holes 21*a* is fixed to the two electrodes 121 to electrically connect the two electrodes 121. The bus bar 2 including the one through hole 21*a* is fixed to the one electrode 121. The bus bar 2 including the one through hole 21*a* is arranged at an end part in the first direction X.

The frame part 22 is continuous with the main body 21, and projects from a side surface of the main body 21 along the second direction Y. The frame part 22 is a portion fixed to a branch part 31 of the circuit body 3. The exemplified frame part 22 is formed in a rectangular frame shape.

The circuit body 3 is a plate-shaped circuit body, and has flexibility. The circuit body 3 according to the present embodiment is Flexible Printed Circuits (FPC). The circuit body 3 includes a plurality of connection conductors 6 (refer to FIG. 4) corresponding to the bus bars 2. The circuit body 3 according to the present embodiment further includes the connection conductor 6 corresponding to a thermistor 8. As illustrated in FIG. 2, the circuit body 3 includes a trunk line part 30 and a plurality of the branch parts 31. The trunk line part 30 and the branch parts 31 are integrally formed.

The trunk line part 30 has a flat plate shape, and extends along the first direction X. That is, a longitudinal direction of the trunk line part 30 is the first direction X. The trunk line part 30 includes a first side 30*a* and a second side 30*b* along the first direction X. The first side 30*a* is an edge of one end in the second direction Y of the trunk line part 30. The second side 30*b* is an edge of the other end in the second direction Y of the trunk line part 30. The branch part 31 is branched from the trunk line part 30. The exemplified circuit body 3 includes the branch parts 31 branched from the first side and the branch parts 31 branched from the second side The branch part 31 branched from the first side 30*a* is connected to the bus bar 2 of the first bus bar group 2A. The branch part 31 branched from the second side 30*b* is connected to the bus bar 2 of the second bus bar group 2B.

The case 4 and the cover 5 constitute a housing body that houses the circuit body 3 and the bus bars 2. The case 4 and the cover 5 are formed of an insulating synthetic resin, for example. The case 4 includes a plurality of housing parts 41 that house the bus bars 2, and a plurality of supporting parts 42 that support the circuit body 3. The housing parts 41 are arranged side by side along the first direction X. The one housing part 41 houses the one bus bar 2. The supporting part 42 extends along the second direction Y, and supports the trunk line part 30 of the circuit body 3 from a lower side. The exemplified case 4 has a substantially rectangular shape in a plan view.

The cover 5 covers the circuit body 3, and the trunk line part 30 of the circuit body 3 is housed between the case 4 and the cover 5. The exemplified cover 5 has a substantially rectangular flat plate shape in a plan view. The cover 5 includes engagement parts 51 to be engaged with the case 4, and is fixed to the case 4.

Each of the branch parts 31 according to the present embodiment includes a coupling branch part 32. The coupling branch part 32 is connected to the two bus bars 2. The two bus bars 2 connected to the coupling branch part 32 include a first bus bar 23 and a second bus bar 24. The first bus bar 23 and the second bus bar 24 are adjacent to each other in the first direction X. The bus bar module 1 according to the present embodiment includes a plurality of the coupling branch parts 32.

FIG. 4 is an enlarged perspective view of the one coupling branch part 32 surrounded by a dashed line in FIG. 2. The coupling branch part 32 includes a base part 33, a first extending part 34, a first fixed part 35, a second extending part 36, a second fixed part 37, and a third extending part 38.

The base part 33 is connected to the trunk line part 30, and extends from the trunk line part 30 along the second direction Y. The first fixed part 35 is fixed to the first bus bar 23. The second fixed part 37 is fixed to the second bus bar 24. The first extending part 34 extends along the first direction X between the base part 33 and the first fixed part 35. The second extending part 36 extends along the first direction X between the first fixed part 35 and the second fixed part 37. The third extending part 38 extends along the first direction X from the second fixed part 37. In the coupling branch part 32 illustrated in FIG. 4, the first extending part 34, the first fixed part 35, the second extending part 36, the second fixed part 37, and the third extending part 38 are arranged in a linear shape in this order.

In the coupling branch part 32, the connection conductors 6 are routed. The connection conductor 6 is formed of metal having electrical conductivity such as copper, for example, metal foil. The connection conductor 6 is sandwiched between two insulating resin layers having flexibility. The connection conductor 6 is, for example, connected to a control device that monitors the battery pack 100.

The connection conductors 6 of the coupling branch part 32 include a first conductor 61, a second conductor 62, and a third conductor 63. The first conductor 61 is routed from the trunk line part 30 to the first fixed part 35, and connected to the first bus bar 23. The second conductor 62 is routed from the trunk line part 30 to the second fixed part 37, and connected to the second bus bar 24. The first conductor 61 and the second conductor 62 are detection lines used for detecting voltage of the battery cell 120. The third conductor 63 is routed from the trunk line part 30 to a distal end of the third extending part 38, and connected to the thermistor 8. The thermistor 8 is installed on the first surface 120*a* of the battery cell 120, and detects a temperature of the battery cell 120. The third conductor 63 is a detection line used for detecting the temperature of the battery cell 120.

FIG. 5 illustrates the bus bar module 1 before the bus bars 2 are housed in the case 4. That is, FIG. 5 illustrates a shape of the branch part 31 before the bus bars 2 are housed in the case 4. The coupling branch part 32 extends in a linear shape along the trunk line part 30. The frame part 22 of the first bus bar 23 is fixed to the first fixed part 35. More specifically, a pad formed of metal foil is exposed at the first fixed part 35. The frame part 22 of the first bus bar 23 is, for example, connected to the pad of the first fixed part 35 by solder. A fuse 7 illustrated in FIG. 4 is interposed between the pad and the first conductor 61. That is, the first conductor 61 is connected to the first bus bar 23 via the fuse 7.

The frame part 22 of the second bus bar 24 is fixed to the second fixed part 37. A pad is exposed at the second fixed part 37. The frame part 22 of the second bus bar 24 is, for example, connected to the pad of the second fixed part 37 by solder. The fuse 7 is interposed between the pad and the second conductor 62. That is, the second conductor 62 is connected to the second bus bar 24 via the fuse 7. The third conductor 63 is connected to the thermistor 8 at the distal end of the third extending part 38.

The second extending part 36 has a length L1. The length L1 is a length along the first direction X, and is a length in a state in which the second extending part 36 is not curved. The length L1 is defined so that the second extending part 36 can be bent to be deformed toward the third direction Z in a state in which the first bus bar 23 and the second bus bar 24 are fixed to the battery cell 120.

FIG. 6 illustrates an enlarged view of the coupling branch part 32 housed in the case 4. The bus bar 2 is inserted into the corresponding housing part 41, and held by the housing part 41. A locking part 43 that locks the bus bar 2 is arranged in the housing part 41. The locking part 43 is disposed on a side wall of the housing part 41, and projects toward an internal space of the housing part 41. The locking part 43 holds the bus bar 2 between a bottom surface of the housing part 41 and the locking part 43.

The case 4 is configured so that the bus bar 2 can follow movement of the battery cell 120 or a tolerance of the battery cell 120. For example, the locking part 43 is arranged so that the bus bar 2 can move within a certain range in the third direction Z. The case 4 includes a coupling part 44 that couples two adjacent housing parts 41. The coupling part 44 has a curved shape, and can be elastically deformed. For example, the coupling part 44 allows relative movement of the housing part 41 along the first direction X or the second direction Y.

FIG. 7 illustrates a perspective view of the coupling branch part 32 arranged in the case 4. As illustrated in FIG. 7, the bus bar 2 is held at a position shifted from the trunk line part 30 of the circuit body 3 in the third direction Z. The case 4 holds the bus bar 2 at a position closer to the battery cell 120 than the trunk line part 30. The first extending part 34 of the coupling branch part 32 is curved in a substantially S-shape when viewed from the second direction Y. That is, the case 4 holds the first bus bar 23 so that the first extending part 34 is curved in an S-shape. Thus, the first bus bar 23 is fixed to the corresponding battery cell 120 while causing the first extending part 34 to be curved in an S-shape.

The second extending part 36 is bent to be deformed in a state in which the coupling branch part 32 is arranged in the case 4. More particularly, the second extending part 36 is curved toward the trunk line part 30 side with respect to the first fixed part 35 and the second fixed part 37. That is, the case 4 holds the first bus bar 23 and the second bus bar 24 so that the second extending part 36 is curved toward the opposite side of the battery cell 120 side. The second extending part 36 has a length capable of being bent to be deformed in a state in which the first bus bar 23 and the second bus bar 24 are held by the case 4. Thus, the first bus bar 23 and the second bus bar 24 can be fixed to the battery cell 120 while the second extending part 36 is bent and deformed.

The third extending part 38 is curved in a substantially S-shape when viewed from the second direction Y. The thermistor 8 is positioned on the opposite side of the trunk line part 30 side with respect to the first fixed part 35 and the second fixed part 37. Thus, the third extending part 38 is curved to be closer to the battery cell 120 as being closer to a distal end of the third extending part 38. The thermistor 8 is held by the case 4 to be able to be brought into contact with the first surface 120*a* of the battery cell 120.

The bus bar module 1 according to the present embodiment can cause the bus bar 2 to appropriately follow the battery cell 120. As illustrated in FIG. 4, the first extending part 34 is curved in a substantially S-shape. Thus, the first bus bar 23 can be caused to appropriately follow the corresponding battery cell 120. For example, the first extending part 34 can allow a following operation of the first bus bar 23 in any of the first direction X, the second direction Y, and the third direction Z. When the first bus bar 23 is assembled to the electrode 121 of the battery module 110, an operator can easily position the first bus bar 23 to the corresponding battery cell 120. In a case in which the battery cell 120 moves relatively to the trunk line part 30 due to thermal expansion and the like, the first extending part 34 allows a following operation of the first bus bar 23.

The second extending part 36 is curved between the first fixed part 35 and the second fixed part 37. Thus, the first bus bar 23 and the second bus bar 24 can be caused to appropriately follow the corresponding battery cell 120. For example, the second extending part 36 can allow following operations of the first bus bar 23 and the second bus bar 24 in any of the first direction X, the second direction Y, and the third direction Z. When the first bus bar 23 and the second bus bar 24 are assembled to the electrode 121 of the battery module 110, an operator can easily position the first bus bar 23 and the second bus bar 24 to the corresponding battery cell 120. In a case in which the battery cell 120 moves relatively to the trunk line part 30 due to thermal expansion and the like, the second extending part 36 allows following operations of the first bus bar 23 and the second bus bar 24.

According to the present embodiment, a degree of freedom in design of the bus bar module 1 is improved. For example, in the bus bar module 1 according to the present embodiment, the thermistor 8 is arranged side by side with the frame parts 22 of the first bus bar 23 and the second bus bar 24. The two frame parts 22 and the thermistor 8 are arranged side by side in a linear shape along the first direction X. The thermistor 8 is positioned between the main body 21 of the second bus bar 24 and the trunk line part 30. That is, the thermistor 8 is adjacent to the main body 21 of the second bus bar 24 in the second direction Y.

The frame part 22 of the second bus bar 24 is shifted from the main body 21 toward the first bus bar 23 side not to interfere with the thermistor 8. In such arrangement, when the one branch part 31 is tried to be independently disposed for the second bus bar 24, the branch part 31 having a sufficient length cannot be secured in some cases.

In the bus bar module 1 according to the present embodiment, a degree of freedom in arrangement of the thermistor 8 and the frame part 22 is improved by connecting the one coupling branch part 32 to the first bus bar 23 and the second bus bar 24. The coupling branch part 32 can secure following properties of the first bus bar 23 and the second bus bar 24 with respect to the battery cell 120 while avoiding interference between the thermistor 8 and the coupling branch part 32. The exemplified coupling branch part 32 includes the third extending part 38 connected to the thermistor 8. With such a routing structure, the circuit body 3 is simplified as compared with a case of disposing the independent branch part 31 for the thermistor 8.

FIG. 8 illustrates the other coupling branch part 32. The coupling branch part 32 illustrated in FIG. 8 has a substantially U-shape or J-shape in a plan view. This coupling branch part 32 is a parallel branch part 32P in which the first extending part 34 and the second extending part 36 are arranged in parallel. In the parallel branch part 32P, the first extending part 34 and the second extending part 36 are arranged side by side in the second direction Y.

In the parallel branch part 32P, the first extending part 34 and the second extending part 36 extend in opposite directions. The first extending part 34 extends toward a first side X1 from the base part 33 to the first fixed part 35. The second extending part 36 extends toward a second side X2 from the first fixed part 35 to the second fixed part 37. The second side X2 is the opposite side of the first side X1. The first side X1 and the second side X2 are not fixed. That is, the first side X1 is a side on which the first extending part 34 is positioned with respect to the base part 33 in the first direction X.

The parallel branch part 32P illustrated in FIG. 8 includes the third extending part 38. The third extending part 38 extends from the second fixed part 37 toward the second side X2, and is connected to the thermistor 8. The thermistor 8 is arranged in a linear shape with respect to the frame parts 22 of the first bus bar 23 and the second bus bar 24. For such arrangement of the thermistor 8, the parallel branch part 32P illustrated in FIG. 8 can improve a degree of freedom in design of the circuit body 3 as described below.

In FIG. 9, an alternate long and short dash line indicates arrangement of the branch part 31 in a case of trying to dispose the independent branch part 31 for the second bus bar 24. The independent branch part 31 corresponding to the second bus bar 24 interferes with the thermistor 8. The parallel branch part 32P illustrated in FIG. 8 can connect the first bus bar 23 and the second bus bar 24 to the trunk line part 30 while avoiding interference with the thermistor 8.

FIG. 10 illustrates another parallel branch part 32P. The parallel branch part 32P illustrated in FIG. 10 is connected to an end part 30*c* in the first direction X of the trunk line part 30. In the parallel branch part 32P in FIG. 10, the first extending part 34 and the second extending part 36 are arranged in parallel similarly to the parallel branch part 32P in FIG. 8. The first extending part 34 extends toward a first side X1 from the base part 33 to the first fixed part 35. The first extending part 34 extends toward a side away from the end part 30*c*. The second extending part 36 extends toward a second side X2 from the first fixed part 35 to the second fixed part 37. The second bus bar 24 is held so that the frame part 22 is positioned on the second side X2 with respect to the end part 30*c* of the trunk line part 30.

In a case of trying to independently dispose the branch part 31 for the second bus bar 24 in FIG. 10, the circuit body 3 needs to include an extending part 30*x* indicated by an alternate long and short dash line. That is, the end part 30*c* of the circuit body 3 needs to be extended toward the second side X2. In the bus bar module 1 according to the present embodiment, a total length of the circuit body 3 can be shortened by disposing the parallel branch part 32P on the circuit body 3.

The branch parts 31 according to the present embodiment include the single branch part 31. The single branch part 31 is connected to the one bus bar 2. That is, the bus bar module 1 according to the present embodiment includes the single branch part 31, the coupling branch part 32 having a straight shape, and the parallel branch part 32P. By combining these branch parts 31, 32, and 32P, a degree of freedom in design and a degree of freedom in routing of the circuit body 3.

As described above, the bus bar module 1 according to the present embodiment includes the bus bars 2 and the plate-shaped circuit body 3 having flexibility. The bus bars 2 are fixed to the battery cells 120 of the battery module 110. The circuit body 3 includes the connection conductors 6 corresponding to the bus bars 2. The circuit body 3 includes the trunk line part 30 and the branch parts 31. The trunk line part 30 extends along the first direction X in which the battery cells 120 are arranged. The branch part 31 is branched from the trunk line part 30 to be connected to the bus bar 2.

The branch parts 31 include the coupling branch part 32 connected to the two bus bars 2. The two bus bars 2 include the first bus bar 23 and the second bus bar 24 adjacent to each other in the first direction X. The coupling branch part 32 includes the first fixed part 35 fixed to the first bus bar 23, the second fixed part 37 fixed to the second bus bar 24, the first extending part 34, and the second extending part 36. The first extending part 34 extends along the first direction X between the trunk line part 30 and the first fixed part 35. The second extending part 36 extends along the first direction X between the first fixed part 35 and the second fixed part 37.

The second extending part 36 has the length L1. The length L1 is a length with which the first bus bar 23 and the second bus bar 24 can be fixed to the battery cell 120 while bending the second extending part 36 to be deformed. With the bus bar module 1 according to the present embodiment, a degree of freedom in design of the bus bar module 1 can be improved. For example, the following property of the bus bar 2 with respect to the battery cell 120 can be secured while avoiding interference between the other component such as the thermistor 8 and the branch part 31. For example, it is possible to reduce the number of required branch parts 31 corresponding to the number of the bus bars 2, and a degree of freedom in design of the circuit body 3 is improved.

The first bus bar 23 and the second bus bar 24 according to the present embodiment are fixed to the battery cell 120 while causing the first extending part 34 to be curved in an S-shape and causing the second extending part 36 to be curved toward the opposite side of the battery cell 120 side. Due to such a curved shape, the following property of the bus bar 2 with respect to the battery cell 120 is secured.

The bus bar module 1 according to the present embodiment includes the parallel branch part 32P as the coupling branch part 32. The parallel branch part 32P is the coupling branch part 32 in which the first extending part 34 and the second extending part 36 are arranged in parallel. The parallel branch part 32P includes the base part 33 connected to the trunk line part 30. The first extending part 34 of the parallel branch part 32P extends from the base part 33 to the first fixed part 35 toward the first side X1 along the first direction X. The second extending part 36 of the parallel branch part 32P extends from the first fixed part 35 to the second fixed part 37 toward the second side X2 opposite to the first side X1. The parallel branch part 32P improves a degree of freedom in design for avoiding interference between the branch part 31 and the other component. The parallel branch part 32P is effective for downsizing the circuit body 3 in the first direction X.

The first extending part 34 is not necessarily curved in an S-shape. For example, in the coupling branch part 32 attached to the battery module 110, the base part 33 and the first fixed part 35 may be disposed at substantially the same position in the third direction Z. In this case, the first extending part 34 may extend from the base part 33 to the first fixed part 35 in a substantially linear shape. The first extending part 34 may be curved toward the third direction Z similarly to the second extending part 36.

The coupling branch part 32 may be connected to three or more bus bars 2. For example, in the coupling branch part 32 illustrated in FIG. 5, a distal end of the third extending part 38 may be connected to a third bus bar instead of the thermistor 8. In this case, the coupling branch part 32 may include a third fixed part fixed to the third bus bar. For example, in the parallel branch part 32P illustrated in FIG. 8, the distal end of the third extending part 38 may be connected to the adjacent bus bar 2 instead of the thermistor 8.

Pieces of the content disclosed in the embodiment described above can be appropriately combined with each other to be performed.

The circuit body of the bus bar module according to the present embodiment includes a coupling branch part connected to two bus bars. The coupling branch part includes a first fixed part fixed to a first bus bar, a second fixed part fixed to a second bus bar, a first extending part, and a second extending part. The second extending part has a length with which the first bus bar and the second bus bar can be fixed to a battery cell while bending the second extending part to be deformed. The coupling branch part can secure, for example, the following property of the bus bar with respect to the battery cell while avoiding interference between other components and the branch part. The bus bar module according to the present invention exhibits an effect of improving a degree of freedom in design.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A bus bar module for a battery module including a plurality of batteries, the plurality of batteries including a first battery cell and a second battery cell, the bus bar module comprising:

a plurality of bus bars including a first bus bar fixed to the first battery cell and second bus bar fixed to the second battery cell; and a plate-shaped circuit body having flexibility and including a plurality of connection conductors, each of the connection conductors corresponds to a respective one of the plurality of bus bars, wherein the circuit body includes a trunk line part extending along a first direction in which the plurality of battery cells are arranged, and a plurality of branch parts branched from the trunk line part, the plurality of branch parts include a coupling branch part connected to the first bus bar and the second bus bar, the first bus bar and the second bus bar are adjacent to each other in the first direction, the coupling branch part includes a first fixed part fixed to the first bus bar, a second fixed part fixed to the second bus bar, a first extending part, and a second extending part, the first extending part extends along the first direction between the trunk line part and the first fixed part, the second extending part extends along the first direction between the first fixed part and the second fixed part, and the second extending part has a length with which the first bus bar and the second bus bar are fixed to the first battery cell and the second battery cell, respectively, while bending the second extending part to be deformed.

2. The bus bar module according to claim 1, wherein the coupling branch part includes a battery cell side that faces toward the first battery cell and the second battery cell, and an opposite side that is opposite to the battery cell side, and the first bus bar and the second bus bar are fixed to the first battery cell and the second battery cell, respectively, while causing the first extending part to be curved in an S-shape and causing the second extending part to be curved toward the opposite side.

3. The bus bar module according to claim 1, further comprising:

a parallel branch part in which the first extending part and the second extending part are arranged in parallel as the coupling branch part, wherein the parallel branch part includes a base part connected to the trunk line part, the first extending part of the parallel branch part extends from the base part to the first fixed part toward a first side along the first direction, and the second extending part of the parallel branch part extends from the first fixed part to the second fixed part toward a second side opposite to the first side.

* * * * *